United States Patent [19]

Matsui et al.

[11] Patent Number: 5,366,619
[45] Date of Patent: Nov. 22, 1994

[54] GERMFREE DRINKING WATER DISPENSER

[75] Inventors: Nobuya Matsui, Osaka; Yasuhiro Morimura, Tokyo; Shinichi Kunisaki, Osaka; Goro Fujiwara, Osaka; Mitsunobu Masuda, Osaka; Masaru Kanazawa, Kyoto, all of Japan

[73] Assignees: Suntory Limited; Takuma Co., Ltd., both of Osaka, Japan

[21] Appl. No.: 134,893

[22] Filed: Oct. 13, 1993

[51] Int. Cl.$^5$ .............................................. B01D 21/30
[52] U.S. Cl. ..................................... 210/139; 210/192
[58] Field of Search ............... 222/146.1, 146.5, 146.6, 222/185, 190; 210/138–140, 192

[56] References Cited

U.S. PATENT DOCUMENTS

| | | | |
|---|---|---|---|
| 1,420,838 | 6/1922 | Held | 210/192 |
| 3,382,980 | 5/1968 | Silva | 210/192 X |
| 3,448,045 | 6/1969 | Hess et al. | 210/192 X |
| 3,550,792 | 12/1970 | Veloz | 210/192 |
| 3,692,180 | 9/1972 | LaRaus | 210/192 X |
| 3,726,404 | 4/1973 | Troglione | 210/139 |
| 3,843,521 | 10/1974 | Zeff | 210/192 X |
| 4,207,994 | 6/1980 | Offlee, Sr. | 222/146.1 |
| 4,801,375 | 1/1989 | Padilla | 222/190 X |
| 5,106,495 | 4/1992 | Hughes | 210/139 |

FOREIGN PATENT DOCUMENTS

| | | | |
|---|---|---|---|
| 4004094 | 1/1992 | Japan | 210/139 |
| 4298289 | 10/1992 | Japan | 210/192 |

*Primary Examiner*—Kevin P. Shaver
*Attorney, Agent, or Firm*—Fisher & Associates

[57] ABSTRACT

A germfree drinking water dispenser includes a reservoir for receiving and reserving drinking water such as mineral water and an ozone injecting device. The ozone injecting device includes a compact ozone generator and an injection opening which is opened into the reservoir. Ozone generated by the ozone generator is injected, by e.g. a blower, through the injection opening into the drinking water at the reservoir. The ozone injecting device is activated only for a short necessary period of time when the dispenser is out of service. So that, after the drinking water in the reservoir is fully sterilized, a sufficient period of time is allowed to lapse for any ozone remaining in the water to dissolve until the next first use of the dispenser.

5 Claims, 1 Drawing Sheet

GERMFREE DRINKING WATER DISPENSER

BACKGROUND OF THE INVENTION

1. Field of the Invention

The present invention relates to a drinking water dispenser for domestic and/or commercial use for dispensing drinking water such as mineral water with the water being sterilized.

2. Description of the Related Art

Conventionally, no drinking water dispensers of the above-noted type have been equipped with means for sterilizing water reserved therein. Such dispenser generally includes a bottle filled with the drinking water such as mineral water and a reservoir for receiving and reserving the drinking water flowed down from the bottle. The filling operation of e.g. the mineral water into the bottle is done in a sanitary manner at a factory under a strict quality control. Thus, even if the mineral water or natural water contains no germicide such as free chlorine therein, the water may be maintained at the germfree condition as long as the water is kept within the sealed bottle.

However, after the water is removed from the bottle into the reservoir, rapid germ propagation occurs due to the contact of the water with the ambience air. For this reason, after being kept for an extended period of time, there develops muddiness in the water, and this muddiness deteriorates the taste of the drinking water.

In order to restrict such germ propagation detrimental to the drinking water, the prior art has suggested periodical cleaning of the reservoir with hot water or water-draining and drying of the reservoir. However, these operations are not only troublesome, but uneconomical because not inexpensive bottled water has to be disposed of wastefully.

In view of the above-described state of the art, a primary object of the present invention is to provide an economical drinking-water dispenser having sterilizing means, which can eliminate e.g. the troublesome reservoir cleaning operation as well as the necessity of wasteful disposal of the bottled water.

Summary of the Invention

For accomplishing the above-described object, a germfree drinking water dispenser, according to the invention, comprises a reservoir for receiving and reserving drinking water and an ozone injecting means. The ozone injecting means includes a compact ozone generator and an inlet opening which is opened into the reservoir. Ozone generated by the ozone generator is injected, by means of e.g. a blower, through the inlet opening into the water reserved within the reservoir.

The drinking water reserved at the reservoir can be sufficiently sterilized by the injected ozone. Further, the injected ozone can be dissolved to be non-hazardous with lapse of time. Accordingly, the ozone injecting means should be operated only for a short period of time during night hours when the dispenser is not used, so that an appropriate amount of time may be secured for allowing the remaining ozone to be sufficiently dissolved before the dispenser is used.

Extensive experiments show that with adequate adjustment of the injection amount the remaining ozone may be sufficiently dissolved to ensure safety of the drinking water and the reserved water need not be disposed of. For instance, germ propagation can be restricted to a satisfactory degree by operating the ozone injecting means for 10 to 60 minutes in a day. And, the experiments show that remaining ozone, if at the level of no more than 0.5 ppm, can be completely dissolved within four hours.

The above-described drinking water dispenser of the invention preferably includes a control means for automatically starting the ozone injecting means and stopping this injecting means after lapse of a predetermined time period. With this, it becomes possible to automatically and reliably effect the above-described process of starting the ozone injecting means, stopping the injecting means, and then allowing the time period necessary for the dissolution of the remaining ozone to lapse before the use of the dispenser.

The drinking-water generally includes a heater unit and/or cooler unit for producing heated and/or cooled water. In the vicinity of the cooler unit, there prevails such a temperature as to restrict propagation of germs. On the other hand, in the vicinity of the heater unit, the prevailing temperature will range between 20 and 35 degrees in Celsius which temperature range is suitable for promoting germ propagation. For this reason, when e.g. the mineral water (containing no germicide such as free chlorine) reserved at the reservoir is left un-used approximately for one week, there tends to develop visible whity muddiness, or even bubbling of metabolism in the water due to the propagation of germ therein.

Therefore, the inlet opening should preferably be disposed at such portion of the ozone injecting means as tending to promote the germ propagation. In particular, when a flow-down pipe for dispensing water is attached to the bottom of the reservoir and the heater means for heating the water is disposed at the base end of the flow-down pipe, the inlet opening of the ozone injecting means should be formed at this bottom of the reservoir.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
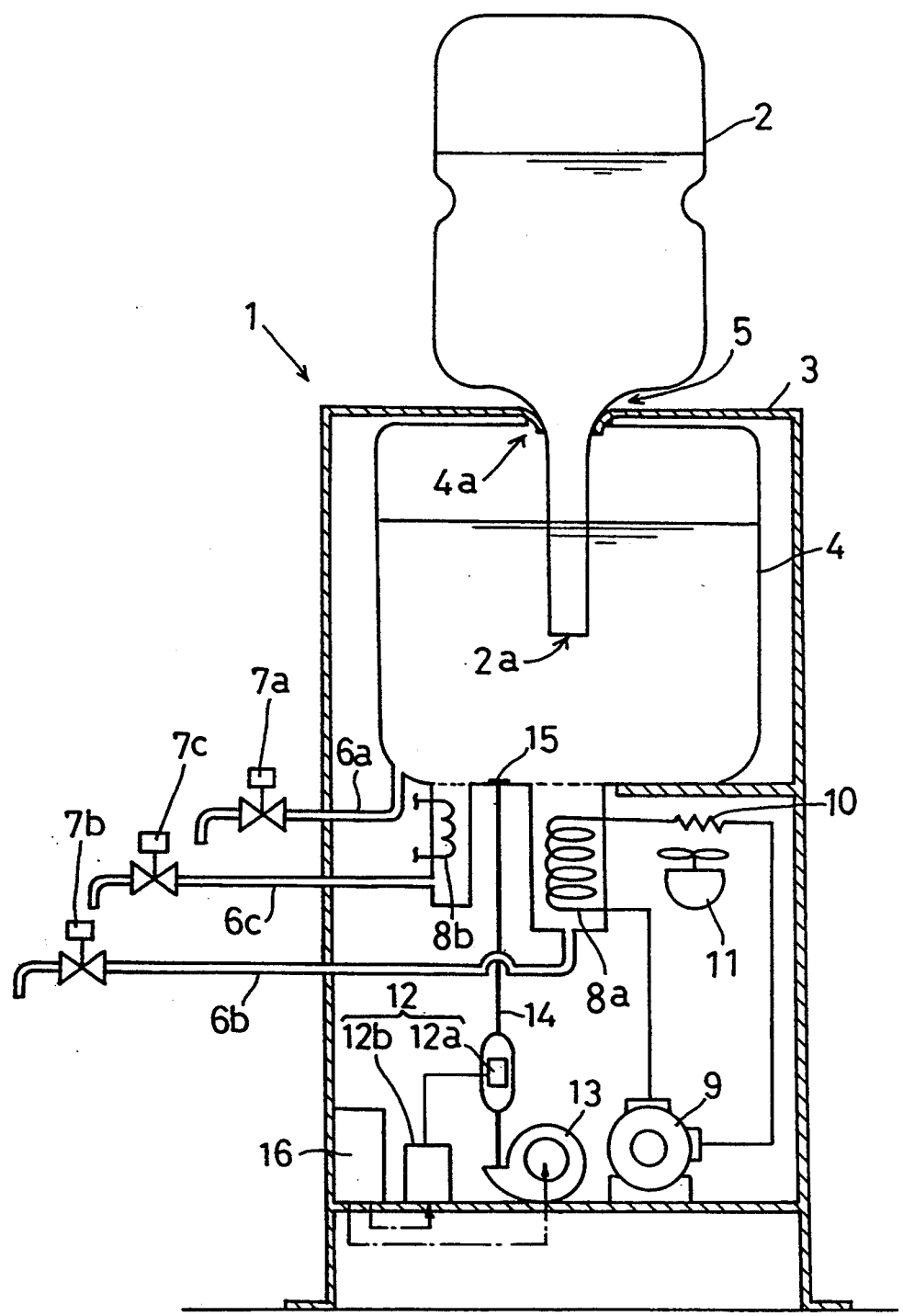
FIG. 1 schematically shows a construction of a germfree drinking water dispenser according to the present invention.

As shown in FIG. 1, a germfree drinking water dispenser includes a body 1 and a bottle 2 filled with such drinking water as mineral water. The body 1 has a case 3 in which a reservoir 4 is housed. An inlet opening 4A is formed at an upper position of the reservoir 4, and an opening 5 is formed in a top plate of the case 3. The bottle 2 is turned upside down with its bottle-neck opening 2a oriented downward and is supported, in this posture, to the top plate of the case 3 of the body 1, so that the bottle-neck opening 2a is inserted through the inlet opening 4a into the reservoir 4.

The drinking water in the bottle 2 flows down through the opening 2a and is temporarily reserved inside the reservoir 4. Then, the water surface in the bottle will be in a level where equilibrium is established between a pressure inside the bottle 2 acting on this water surface and an atmospheric pressure acting on the water surface inside the reservoir 4.

The drinking water reserved in the reservoir 4 can be dispensed from a dispensing tap 7a through a flow-down pipe 6a communicating with the bottom of the reservoir 4. Further, cooled water can be dispensed from a further dispensing tap 7b through a further flow-down pipe 6b. And, heated water can be dispensed through a still further dispensing tap 7c through a still further flow-down pipe 6c. At a base end of the flow-down pipe 6b for the cooled water, there is provided an evaporator 8a, as a cooler means, of a heat pump. Similarly, at a base end of the flow-down pipe 6c for the heated water, there is provided a sheathed heater 8b, as a heater means, of the heat pump. In the drawing, reference numerals 9, 10 and 11 denote a compressor, a condenser and a fan of the heat pump, respectively.

The dispenser further includes an ozone injecting means for injecting air containing sterilizing ozone into the drinking water reserved within the reservoir 4. This ozone injecting means includes a compact ozone generator 12, a blower 13, a feed pipe 14 for feeding the ozone-containing air and an injection opening 15 formed at the leading end of the feed pipe 14.

The ozone generator 12, which per se is conventional, includes a ceramic panel 12a and a high-voltage power source 12b. The ceramic panel 12a is accommodated within a small chamber formed at an intermediate position of a feed pipe for air fed by the blower 13. As this ceramic panel 12a is impressed with a high potential from the power source 12, ozone is generated. The generation amount of ozone is adjustable by a variable resistor attached to the high-voltage power source 12. A portion of the air fed by the blower 13 is made into ozone by means of the ozone generator 12; and this ozone-containing air is guided through the feed pipe 14 and the injection opening 15 and directly injected into the drinking water inside the reservoir. More particularly, the ozone-containing air in the form of air bubbles is dissolved into the drinking water through the inlet opening 15 opened at the bottom of the reservoir 4. Incidentally, the inlet opening 15 is provided with either an air diffusing means such a hydrophobic gas-permeable membrane or an anti-reverse means such as an anti-reverse valve, thereby to prevent flow of the water from the reservoir 4 to the feed pipe 14.

Further, a control means 16 is provided for controlling activation and de-activation of the ozone injecting means. This control means 16 has a real-time clock function and a timer function, so that the control means 6 automatically activates the ozone injecting means at a time (e.g. night time) when the drinking water is not dispensed from the dispenser and then de-activates the injecting means after a predetermined time period. For instance, the control means 6 can activate the ozone generator 12 for 30 (thirty) minutes starting at 1 A.M. Further, prior to the activation of the injecting means, the control means 6 also checks to make sure that the level of the drinking water in the reservoir 4 exceeds a predetermined level, so as not to activate the injecting means when the level does not exceed the predetermined level.

As described above, according to the dispenser of the invention, the drinking water in the reservoir 4 is sterilized during its out-of-service hours (e.g. night hours) to allow lapse of sufficient period of time necessary for the ozone content to be dissolved before a user starts using the dispenser in the morning, for example.

Next will be described the extensive experiments conducted by this inventor to confirm the effect of the drinking water dispenser having the above-described ozone injecting means.

In the present experiments, the reservoir 4 had the dimensions of 30 cm×30 cm×35 cm (effective water depth: 20 cm) and the storage capacity of 18 liters. The blower 13 had the air feed capacity of 0.5 to 1 liter/min. The ozone generator 12 was adjusted to generate ozone at 4.5 to 5.0 mg/hr. And, the ozone injection was done one time in a day. The injection time periods were varied in three ways of 20, 30 and 60 minutes. During the experiment period, the drinking water was sampled from the heated-water tap 7c, by 2 (two) liters x two times a day (4 liters in total). The measurement of the number of germs present in the reservoir 4 was done by using a standard agar cultivation medium, and the numbers of living germs were counted for those which formed a colony in the medium after cultivation for 48 hours at 36 degrees in Celsius.

The numbers of the germs inside the reservoir 4 were observed to change according to day(s) lapsed as shown in a table 1 next.

In this table, a mark "ND" denotes no germs detected. Also, for comparison, experiments were conducted under the same conditions using a conventional drinking water dispenser without the ozone injecting means. The results of these experiments on the conventional apparatus are illustrated in the right end column of the table.

TABLE 1

| days lapse | drinking water dispenser with ozone injection | | | drinking water dispenser of prior art |
|---|---|---|---|---|
| | injection time | | | |
| | 20min./day | 30min./day | 60min./day | |
| | injection amount | | | |
| | 0.17ppm | 0.25ppm | 0.5ppm | 0ppm |
| 1 | $<10^2$ | ND | ND | $<10^2$ |
| 2 | $<10^2$ | ND | ND | $1.3 \times 10^3$ |
| 4 | ND | ND | ND | $2.9 \times 10^4$ |
| 6 | $<10^2$ | ND | ND | $1.7 \times 10^5$ |
| 8 | $1.5 \times 10^2$ | ND | ND | $4.5 \times 10^5$ |
| 10 | ND | ND | ND | $1.1 \times 10^5$ |
| 20 | ND | ND | ND | $2.2 \times 10^5$ |
| 30 | ND | ND | ND | $5.1 \times 10^4$ |
| 60 | ND | ND | ND | $1.9 \times 10^5$ |

As illustrated in the above Table, the injection amounts of ozone varied at 0.17 ppm, 0.25 ppm and 0.5 ppm, respectively for the injection time periods of 20, 30 and 60 minutes. As shown, even with the lowest ozone concentration of 0.17 ppm, the number of living germs was lower than $10^2$; and with the 0.25 ppm concentration, no germs were observed at all in any cases and the water was observed as clear, tasteless and odorless as the new mineral water.

The present invention is not limited to the above-described embodiments but may be modified in many ways without departing from the subject. For instance, the high-voltage power source 12b of the ozone generator and the control means 16 may be constructed as one integral unit. The ozone injecting means may be activated and de-activated manually. Further, in the disclosed embodiment, the blower feeds the air to the injecting means for a portion of this air to be made into ozone, and the injecting means injects this ozone-containing air into the drinking water. Instead, the injecting means may be designed to periodically ozonize a small portion of liquid oxygen stored at an oxygen tank to inject it into the drinking water.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A drinking water dispenser for dispensing drinking water, such as mineral water, under a germfree condition, comprising:

a reservoir for receiving and reserving said drinking water;

a bottle filled with said drinking water, said bottle having only one opening, said opening being a bottle-neck opening;

an inlet opening formed at an upper portion of said reservoir for allowing introduction of said bottle-neck opening and thereby rendering said reservoir airtight; and an ozone injecting means including an ozone generator and an injection opening for injecting ozone generated by the ozone generator into said drinking water reserved at said reservoir through a feed pipe;

wherein said injection opening is provided with an anti-reverse means for preventing reverse flow of said water from said reservoir to said feed pipe.

2. A drinking water dispenser according to claim 1, further comprising:

a control means for automatically starting said ozone injecting means and stopping said ozone injecting means after lapse of a predetermined time period when said dispenser is out of service.

3. A drinking water dispenser according to claim 2, wherein said control means controls said ozone injecting means such that the concentration of ozone remaining in said drinking water may not exceed 0.5 ppm and said ozone injecting means may be stopped for more than 4 hours before said dispenser is used.

4. A drinking water dispenser according to claim 1, wherein flow-down pipe for dispensing said water is connected to a bottom of said reservoir, and a heating means for heating said water is provided adjacent a base end of said flow-down pipe, said injecting opening of said ozone injecting means being disposed in said bottom of said reservoir.

5. A drinking water dispenser according to claim 1, wherein said anti-reverse means comprises a hydrophobic gas-permeable membrane.

* * * * *